(No Model.)

E. S. SMITH.
CAR COUPLING.

No. 277,363. Patented May 8, 1883.

WITNESSES:
S. Williamson
Geo. H. McLean

INVENTOR
Earl Sidney Smith
By Daniel Breed
Attorney

UNITED STATES PATENT OFFICE.

EARL SIDNEY SMITH, OF CHASE, MICHIGAN.

CAR-COUPLING.

SPECIFICATION forming part of Letters Patent No. 277,363, dated May 8, 1883.

Application filed March 7, 1883. (No model.)

*To all whom it may concern:*

Be it known that I, EARL SIDNEY SMITH, a citizen of the United States, residing at Chase, in the county of Lake and State of Michigan, have invented certain new and useful Improvements in Car-Couplings, of which the following is a specification, reference being had therein to the accompanying drawings.

My invention consists of a novel arrangement of pivoted elbow-lever, in combination with a pivoted link and latch for coupling cars, which will be fully understood by the following description.

Figure 1:
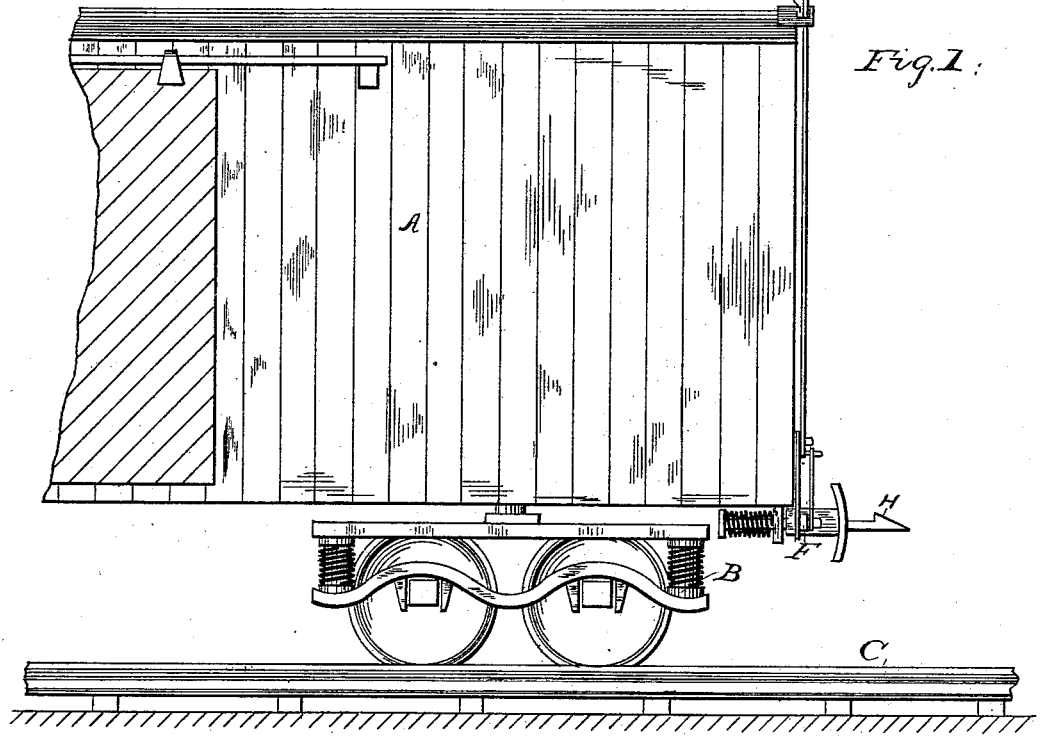
Figure 2:
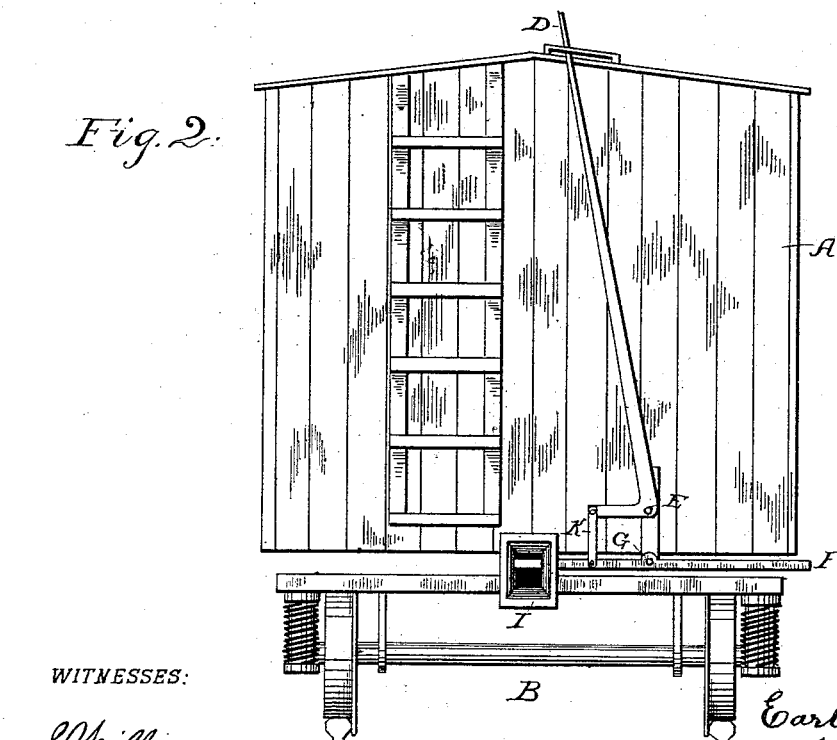

In the accompanying drawings, Figure 1 is the side view of a railroad-car with my improvements attached thereto. Fig. 2 is the end view of the same.

My improvement in car-couplings is designed for freight-cars; and I employ a long lever extending above the top of the car, so as to be operated from the roof of a box-car.

In the drawings, A represents a box-car upon the truck B and rail C in the usual manner. Upon the end of the car is placed a long lever, D, pivoted at E, and extending above the top of the car, so as to be operated from the roof of the box-car. A horizontal latch or coupling-pin, F, is pivoted at G, and extends across and latches with the coupling-bar or draw-bar H inside of the draw-head I, Fig. 2. A link, K, is pivoted to the lever D, and also to the latch F, thus giving a strong purchase with said lever, if necessary, in uncoupling the cars, and yet the weight of this link and also the weight of the lever D are thrown upon the latch. At the top of the car is a catch, L, to hold the lever in a locked position, and a spring may be used to retain the lever from being moved by the jar of the cars.

My combination of devices may be used with a horizontal lever extending to the side of the car, if desired.

Having described my invention, what I claim is—

The above-described lever D, pivoted at E, in combination with the link K and latch F, for the purpose of facilitating the coupling and uncoupling of the cars, substantially as set forth.

In testimony whereof I affix my signature in presence of two witnesses.

EARL SIDNEY SMITH.

Witnesses:
ALBERT J. CAMPBELL,
ELMER E. BLAKESLEE.